(12) United States Patent
Samuel et al.

(10) Patent No.: US 10,487,226 B2
(45) Date of Patent: Nov. 26, 2019

(54) LOW ODOR RADIATION CURABLE INK COMPOSITIONS

(71) Applicant: Electronics for Imaging, Inc., Fremont, CA (US)

(72) Inventors: Joshua Samuel, Ann Arbor, MI (US); Huilei Zhang, Ypsilanti, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 15/472,630

(22) Filed: Mar. 29, 2017

(65) Prior Publication Data

US 2017/0342281 A1    Nov. 30, 2017

Related U.S. Application Data

(60) Provisional application No. 62/341,303, filed on May 25, 2016.

(51) Int. Cl.

| C09D 11/101 | (2014.01) |
|---|---|
| C09D 11/107 | (2014.01) |
| C09D 11/322 | (2014.01) |
| D21H 19/58 | (2006.01) |
| C09D 11/102 | (2014.01) |

(52) U.S. Cl.
CPC .......... C09D 11/101 (2013.01); C09D 11/102 (2013.01); C09D 11/107 (2013.01); C09D 11/322 (2013.01); D21H 19/58 (2013.01)

(58) Field of Classification Search
CPC ..... C09D 11/30; C09D 11/101; C09D 11/102; C09D 11/107; C09D 11/322; D21H 19/58
USPC ........................................................ 428/211
See application file for complete search history.

(56) References Cited

U.S. PATENT DOCUMENTS

| 7,737,349 B1 | 6/2010 | Spurgeon et al. |
|---|---|---|
| 7,837,318 B2 | 11/2010 | Cohen et al. |
| 2004/0115561 A1 | 6/2004 | Laksin et al. |
| 2008/0182086 A1 | 7/2008 | Satou et al. |
| 2008/0204538 A1* | 8/2008 | Kovacs ................. C09D 11/101 347/102 |
| 2009/0000508 A1 | 1/2009 | Edison et al. |
| 2009/0208651 A1 | 8/2009 | Oyanagi et al. |
| 2011/0109712 A1 | 5/2011 | Grant et al. |
| 2013/0010039 A1* | 1/2013 | Kida .................... C09D 11/101 347/100 |
| 2013/0258017 A1 | 10/2013 | Kagose et al. |
| 2014/0118451 A1 | 5/2014 | Nakane et al. |
| 2014/0220312 A1* | 8/2014 | Wu ........................ C09D 11/30 428/195.1 |
| 2014/0313267 A1 | 10/2014 | Fassam et al. |
| 2015/0315396 A1 | 11/2015 | Kida et al. |
| 2015/0367655 A1 | 12/2015 | Hara |
| 2015/0368493 A1 | 12/2015 | Yamada |

FOREIGN PATENT DOCUMENTS

CN    104830148 A  *  8/2015

OTHER PUBLICATIONS

Machine Translation of CN 104830148 (Year: 2015).*
International Search Report and Written Opinion PCT/US2017/034446 dated Aug. 14, 2017, pp. 1-9.
International Search Report and Written Opinion PCT/US2017/034449 dated Aug. 21, 2017, pp. 1-6.
Leach, "The Printing Ink Manual"; retrieved on Jul. 18, 2017 from url: https://books.google.com/books?id=G2wyBwAAQBQJ&pg=PA541; 1988; p. 541.
Non-Final Office Action dated May 11, 2018 for U.S. Appl. No. 15/603,880 of Samuel et al.
Non-Final Office Action dated Sep. 11, 2018 for U.S. Appl. No. 15/603,880 of Samuel et al.

* cited by examiner

*Primary Examiner* — Scott R. Walshon
*Assistant Examiner* — Sathavaram I Reddy
(74) *Attorney, Agent, or Firm* — Perkins Coie LLP

(57) ABSTRACT

The present invention relates to low odor radiation curable ink compositions. The composition comprises 10-40% w/w of 4-hydrobutylacrylate, 5-25% of a urethane (math)acrylate oligomer, 10-55% of diacrylates, one or more photoinitiators, one or more additives, and one or more pigments. The composition excludes many monofunctional monomers that have distinct odor and are commonly used in an ink jet composition.

2 Claims, No Drawings

LOW ODOR RADIATION CURABLE INK COMPOSITIONS

This patent application claims priority from U.S. Provisional Application No. 62/341,303, filed May 25, 2016, which is incorporated herein by reference in its entirety.

TECHNICAL FIELD

This invention relates to low odor radiation curable ink compositions. In particular, the ink composition includes a polymerizable monofunctional monomer 4-hydrobutylacrylate and excludes monofunctional monomers that have distinct odors.

BACKGROUND OF THE INVENTION

Inkjet inks used for drop on demand (DOD) printing need to use low viscosity materials to yield a viscosity of up to approximately 12 cP at jetting temperatures. Monomers have low molecular weight and high vapor pressure. Many of the monomers used in the inkjet inks have distinct odors that can lead to taint when used on secondary or tertiary packaging.

Monomers may have multiple acrylate groups. The higher number of acrylate groups leads to a polymer with a higher degree of cross linking, which reduces odor. A higher degree of cross linking also leads to a faster curing material and a harder material. However, higher cross linking will lead to a more brittle ink which will not be acceptable for application that requires bending of the ink layer without cracking such as in corrugated board where creasing is required.

DETAILED DESCRIPTION OF THE INVENTION

This invention addresses the need for a fast curing, flexible, low odor ink, particularly for use in single pass printing of paper based corrugated stock such as cardboard boxes. The present invention provides an ink that has a very low odor and good flexibility. The ink is curable by actinic radiation, more specifically using LED generated light. The ink is designed to be suitable for packaging, particularly for single pass printing on paper-based corrugated material. The ink exhibits minimal odor in the wet state and in the fully cured state.

The present invention provides a low odor radiation curable ink composition. Low odor is defined by the response of a panel of people who are not habituated to the printed article. Low odor does not have a strong smell or an undesired smell, and is in general acceptable to people. The ink composition comprises: 10-40% w/w of 4-hydrobutylacrylate (4HBA), 5-25% of one or more urethane (meth) acrylate oligomer, 10-55% of diacrylates, one or more photoinitiators, and one or more additives. The present ink composition provides a low viscosity of about 8-14 cP at 45° C. which is required to be able to jet from the printer head. The present ink composition excludes monofunctional monomers that have an undesired odor such as vinyl caprolactam, 2-phenoxyethyl acrylate, isodecyl acrylate, 3,3,5-trimethylcyclohexyl acrylate, isooctyl acrylate, octyldecyl acrylate, isobornyl acrylate, cycloaliphatic acrylate monomer, benzyl acrylate, di(ethylene glycol) 2-ethylhexyl acrylate, tridecyl acrylate, 2(2-ethoxyethoxy) ethyl acrylate, lauryl acrylate, and tetrahydrofurfuryl acrylate. By exclusion, it means that the ink composition does not contain a substantial amount of the undesired monofunctional monomers. "A substantial amount", as used herein, refers to at least 5%, preferably at least 1%, at least 0.3%, or at least 0.1%.

The present composition uses a limited number of monoacrylates that have been identified as low odor, in combination with 4-HBA. These compounds have acceptably high cure rates in combination with a diacrylate at a sufficiently low level to enable a fast cure rate with sufficient flexibility and with an acceptably low odor for applications such as tertiary packaging.

The present invention is also directed to paper based corrugated stock such as a cardboard box having the fast curing, flexible, low odor ink composition printed and cured on its surface.

Unless specifically mentioned, all percentages (%) in this application refer to % by weight, unless otherwise specified.

Mono Functional Monomers

The present ink composition comprises 10-50%, by weight of one or more mono-functional monomers that have no odor and acceptable low odor. Mono-functional monomers do not crosslink with each other and provide flexibility of ink film after curing. 4-Hydroxybutyl acrylate (4HBA, CAS No.: 2478-10-6), which is a polymerizable monofunctional monomer, is an essential mono-functional monomer in the present ink composition. 4HBA has a low viscosity and has low odor; it has sufficiently high flexibility with a high cure rate. 4HBA, with a primary hydroxyl group at the end of a longer alkyl chain, gives excellent scratch resistance due to its high crosslinking ratio and unique flexibility. The present ink composition comprises 10-40% w/w of 4HBA, and preferably 15-30% or 15-25% 4HBA.

The present ink composition optionally includes other low-odor mono functional monomers. In one embodiment, mono-functional monomers include acrylates or methacrylates. In another embodiment, mono-functional monomers include a vinyl ether. Examples of suitable mono-functional monomers for the present ink composition include, but are not limited to, cyclic trimethylolpropane formal acrylate (SR531), Genomer 1122 (a urethane acrylate) from RAHN, ethyl vinyl ether, and mono-functional methoxylated PEG (350) acrylate (SR551), alkoxylated phenol acrylate monomer (SR9087), alkoxylated tetrahydrofurfuryl acrylate (SR611), ethoxylated (4) nonyl phenol acrylate (SR504), and ethoxylated (8) nonyl phenol acrylate (Miramer M166 from RAHN).

Monomers that have odor and are excluded from the present ink composition are shown in Table 1.

TABLE 1

| Strong Smell | Chemical Name | CAS # | Viscosity cP |
| --- | --- | --- | --- |
| VCAP | Vinyl caprolactam | 2235-00-9 | |
| PHEA | 2-phenoxyethyl acrylate | 48145-04-6 | 12 |
| IDA | Isodecyl acrylate | 1330-61-6 | 5 |
| TMCHA | Acrylic monomer 3,3,5-trimethylcyclohexyl acrylate | 86178-38-3, 116-02-9 | 6 |
| IOA | isooctyl acrylate | 29590-42-9 | 5 |
| ODA | Octyldecyl acrylate | 2499-59-4, 2156-96-9 | 4 |
| IBOA | Isobornyl acrylate | 5888-33-5 | 8 |
| TBCHA | Cycloaliphatic acrylate monomer | 84100-23-2 | 9 |
| BZA | Benzyl acrylate | 2495-35-4 | 5 |
| EH(EO)2A | Di(ethylene glycol) 2-ethylhexyl acrylate | 117646-83-0 | 15 |

TABLE 1-continued

| Smell | Chemical Name | CAS # | Viscosity |
|---|---|---|---|
| TDA | Tridecyl acrylate, | 3076-04-8 | 7 |
| EOEOEA | 2(2-ethoxyethoxy) ethyl acrylate | 7328-17-8 | 6 |
| LA | Lauryl acrylate | 2156-97-0 | 6 |

| Smell, volatility and irritation | Chemical Name | CAS # | Viscosity |
|---|---|---|---|
| THFA | Tetrahydrofurfuryl acrylate | 2399-48-6 | 6 |

Other than vinyl Caprolactam, the above excluded monomers are monofunctional acrylates. Monofunctional acrylates are important components for the present ink composition because they provide sufficient flexibility of the ink. Monofunctional acrylates have only one acrylate group, and if they exhibit a strong odor, they are most prone to leaving a residual odor in the cured product because they do not crosslink completely into the film and are volatile.

Diacrylates

In addition to mono-functional monomers, the present ink composition comprises 10-55%, preferably 30-55%, of acceptable low odor or no odor di-functional monomers to speed up the polymerization process and increase the chemical resistance. Examples of suitable di-functional monomers include, but are not limited to, diacrylate or dimethacrylate of diols and polyetherdiols, such as propoxylated neopentyl glycol diacrylate, 1,6-hexanediol diacrylate, dipropylene glycol diacrylate, tripropylene glycol diacrylate, triethylene glycol diacrylate, 1,4-butanediol diacrylate (e.g, SR213), alkoxylated aliphatic diacrylate (e.g. SR9209A), diethylene glycol diacrylate, alkoxylated hexanediol diacrylate (e.g, SR561, SR562, SR563, SR564 from Sartomer Co., Inc), polyethylene glycol (200) diacrylate (SR259), and polyethylene glycol (400) diacrylate (SR344).

Preferred diacrylates for the present ink composition includes propoxylated neopentyl glycol diacrylate (CAS No: 84170-74-1), dipropylene glycol diacrylate (CAS No: 57472-68-1), and tripropylene glycol diacrylate (CAS No: 42978-66-5).

Urethane (meth)acrylate Oligomer

It is preferable to use an oligomer component of low viscosity, low volatility, high reactivity, low glass transition temperature, and good adhesion to multiple substrates in the ink compositions. The functionality of the oligomer component is preferably not greater than 3, and more preferably not greater than 2. The low functionality contributes to more flexible ink compositions.

The present ink composition comprises at least 5%, preferably at least 10%, and up to 25% (for example, 10-25%) of a flexible urethane acrylate oligomer. Urethane acrylate oligomers suitable for the present ink composition include CN9009, CN990, CN991, from Sartomer, Ebercryl 8402, Ebersryl 8411 from Allnex, Genomer 4215, Genomer 4230 and Geonmer 4267 from RAHN, Miramer PU2100, Miramer PU2200 from MIWON, Photomer 6891, Photomer 6892 and Photomer 6230 from IGM, NeoRad U-61 and NeoRad U-20 from DSM.

Photoinitiators

The ink composition of the present invention comprises 1-15% by weight of one or more photoinitiators.

Acylphosphine oxide photoinitiators include diphenyl(2,4,6-trimethylbenzoyl)phosphine oxide (TPO), phenylbis(2,4,6-trimethylbenzoyl)-phosphine oxide (Irgacure 819), ethyl (2,4,6-trimethylbenzoyl)-phenylphosphine oxide (TPO-L), and their derivatives and polymeric version derivatives.

In addition to acylphpsphine oxide, the present ink composition may comprise other photoinitiators such as thioxanthones: 2-isopropyl thioxanthone, 2-chlorothioxanthone, 2-methylthioxanthone, 2 ethylthioxanthone, 2-tert-butylthioxanthone, 2-phenylthioxanthone, 2-benzylthioxanthone, 2-benzylthioxanthone, and 4-isopropylthioxanthone, polymeric thioxanthones.

Other useful photoinitiators that may be used in the present ink composition include, but are not limited to, 2-benzyl-2-dimethylamino-1-(4-morpholinophenyl)-butanone-1 (Irgacure 369), 2-methyl-1-[4-(methylthio)phenyl]-2-(4-morpholinyl)-1-propanone (Irgacure 907), 2-(4-methylbenzyl)-2-(dimethylamino)-4-morpholinobutyrophenone (Irgacure 379), 1-hydroxycyclohexylphenyl ketone, 2-hydroxy-4'-(2-hydroxyethoxy)-2-methylpropiophenone, 2-hydroxy-2-methyl-1-phenyl-1-propanone, oligo or dimer (2-hydroxy-2-methyl-1-[4-(1-methylvinyl)phenyl]propanone). Suitable blends of photoinitiators commercially available include, but are not limited to, those under the designations of Darocur 4265, Irgacure 2022, and Irgacure 2100 from BASF; and Esacure KT37, Esacure KT55, and Esacure KT046 IGM.

Additives

The present ink composition may further include 0.01-5%, preferably 0.1-3% by weight of one or more additive components. Various additives may be included in the ink compositions, including one or more of a surfactant, a leveling additive, a stabilizer, and other suitable additives.

A surfactant is used to reduce the surface tension of the ink compositions to improve wetting property of the inks on substrates. The amount of surfactant in the ink compositions is 0.01-2% by weight, and preferably 0.05-1% by weight. It is preferred that the surfactant comprises at least one polysiloxane acrylate, also known as a silicone acrylate, which participates in the radiation curing process to be part of cured ink. Examples of a suitable surfactant include, but are not limited to, those under the designations of TEGORAD 2200N, TEGORAD 2100, and TEGORAD 2300 from Evonik Resource Efficiency GmbH, TEGO Products and BYK 307, BYK 330, BYK 377 and BYK 3510 (BYK CHEMIE GMBH (Wesel, FRG).

A leveling additive may be used to improve the flowing property of ink to produce a more uniform surface of ink film. The amount of leveling agent in the ink compositions is 0.1-2% by weight. Examples of suitable leveling agent include, but are not limited to, those under the designation of BYK 361N, BYK 353, and BYK 354 and so on. (BYK CHEMIE GMBH).

A stabilizer is used to improve the shelf life and photolytic stability of ink compositions. Stabilizers in the ink compositions can include an ultraviolet light stabilizer and hindered amine light stabilizer. These stabilizers are used to improve the outdoor durability and weatherability of cured ink. Commercially available ultraviolet light stabilizers include, but are not limited to, those under the designation of TINUVIN® 460, TINUVIN® 479, TINUVIN® 171, TINUVIN® 928, TINUVIN® 123, TINUVIN® 1130, TINUVIN® 400 TINUVIN® 152 and TINUVIN® 292 from BASF AG, Ludwigshafen, FRG. One or more UV inhibitor/stabilizers may be present in the ink compositions. They can be present in the ink compositions in amounts of 0.01%-2% by weight, and more specifically 0.1%-1% by weight.

A free radical scavenger stabilizer is used to improve the stability of ink against heat. Examples of a free radical scavenger include, but are not limited to, hydroquinone, 4-methoxyphenol, hindered phenol, etc. The amount of free radial scavenger stabilizer can be present in ink compositions in 0.05-2% by weight, and more specifically 0.1-0.75% by weight. A small amount is preferably used in the ink compositions to minimize their interference with the radiation curing process. Examples of free radical scavengers include, but are not limited to, hydroquinone, 4-methoxyphenol, hindered phenol such as IRGASTAB® UV 22 (an in-can stabilizer that inhibits early polymerization in UV curable ink and coating formulations) from BASF, and IN515 (tris(N-nitroso-N-phenyl-hydroxylamine)-aluminum salt+92% 2-phenoxyethyl acrylate) from IGM.

Colorant Component

The present ink composition may further comprise a colorant component if color is desired. The colorant can be pigments, dyes, or a combination of pigments and/or dyes. The amount of colorant component in the ink compositions is in the range of 0-20% by, more preferably 0-8% by weight. A clear ink has 0% colorant.

Examples of suitable Pigments include, but are not limited to, those under the designation of Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, and Pigment Blue 60; Pigment Brown 5, Pigment Brown 23, and Pigment Brown 25; Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 120, Pigment Yellow 128, Pigment Yellow 129, Pigment Yellow 138, Pigment Yellow 139, Pigment Yellow 150, Pigment Yellow 154, Pigment Yellow 156, and Pigment Yellow 175; Pigment Green 1, Pigment Green 7, Pigment Green 10, and Pigment Green 36; Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, and Pigment Orange 61; Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, and Pigment Red 224; Pigment Violet 19, Pigment Violet 23, Pigment Violet 37, Pigment Violet 32, Pigment Violet 42; and Pigment Black 6 or 7 (The Colour Index, Vols. 1-8, by the Society of Dyers and Colourists, Yorkshire, England), Black PB 2 and 5; carbon black; titanium dioxide (including rutile and anatase); zinc sulfide, and the like or a mixture thereof.

If pigment is used in the ink compositions, preferably, the pigment is pre-dispersed prior to incorporation, generally into one or more of the monomer and/or oligomer components used in the ink compositions. In embodiments, the colorant is added as a pigment slurry prepared with a portion of a reactive diluent such as propoxylated 2-neopentyl glycol diacrylate (SR-9003, Sartomer USA, LLC). Dispersion agents generally are used to improve the stability of dispersion by reducing or avoiding the possibility of pigment particle settling or agglomerating. Examples of suitable dispersion agents include, but are not limited to, those under the designations of Solsperse 32000 from Lubrizol® Advanced Materials, and DisperBYK 111 and DisperBYK180 from Byk Chemi®. The pigment in the dispersion can be 20-80% by weight. Other additives such as stabilizers, flowing additive, etc. can be incorporated during the dispersion process to improve the stability of dispersion.

The invention is further illustrated by the following examples.

EXAMPLES

Example 1. A Low Odor Ink Composition

Table 1 shows the components for a low odor ink composition.

TABLE 1

Ink Composition

| Function | Chemical Name | weight % |
|---|---|---|
| Difunctional monomer | Dipropylene glycol diacrylate DPGDA | 41.5 |
| Difunctional monomer | Propoxylated (2) neopentyl glycol diacrylate NPG(PO)2DA | 8 |
| Monofunctional monomer | 4-Hydrobutylacrylate | 25 |
| Oligomer | Aliphatic urethane diacrylate | 10 |
| Photoinitiator | TPO | 5 |
| Photoinitiator | TPO-L | 5 |
| Photoinitiator | IRGACURE ® 819 | 2 |
| Additive | Polyacrylate Leveling agent | 0.5 |
| Additive | Silicone-containing surface additive | 0.5 |
| Pigment | Cyan pigment | 2 |
| Stabilizer | STABILIZER UV22 | 0.5 |
| | | 100 |

The above ingredients (chemicals) were added to a container, and mixed by magnetic or mechanic mixers to form the cyan ink. Then the ink was filtered through 1 micron filter.

It is to be understood that the foregoing describes preferred embodiments of the present invention and that modifications may be made therein without departing from the scope of the present invention as set forth in the claims.

What is claimed is:

1. A paper-based corrugated stock having a low odor radiation curable ink composition printed and cured on its surface, wherein the low odor radiation ink composition comprises:
   25% w/w of 4-hydrobutylacrylate,
   41.5% w/w of dipropylene glycol diacrylate,
   8% w/w of propoxylated neopentyl glycol diacrylate,
   10% w/w of aliphatic urethane diacrylate,
   5% w/w of diphenyl(2,4,6-trimethylbenzoyl)phosphine oxide (TPO),
   5% w/w of ethyl (2,4,6-trimethylbenzoyl)phenylphosphinate (TPO-L),
   2% w/w of phenylbis(2,4,6-trimethylbenzoyl)phosphine oxide,
   0.5% w/w of polyacrylate leveling agent
   0.5% w/w of silicone-containing surface additive,
   2% w/w pigment, and
   0.5% w/w stabilizer.

2. The paper-based corrugated stock of claim 1, wherein the ink viscosity is 8-14 cP at 45° C. or less than 30 cp at 25° C.

* * * * *